United States Patent
Chintala et al.

(10) Patent No.: US 7,210,963 B2
(45) Date of Patent: May 1, 2007

(54) DEVICES AND METHODS FOR CONNECTING HOUSINGS

(75) Inventors: Thomas J. Chintala, San Diego, CA (US); Scott R. Semenik, Saint Charles, IL (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/964,405

(22) Filed: Oct. 12, 2004

(65) Prior Publication Data

US 2006/0079128 A1   Apr. 13, 2006

(51) Int. Cl.
*H01R 13/40* (2006.01)
(52) U.S. Cl. .................. 439/594; 439/135; 361/679; 455/575.1
(58) Field of Classification Search ............. 439/594, 439/592, 586, 135; 455/90, 571.1, 90.3, 455/128, 347, 575.1; 361/679
See application file for complete search history.

(56) References Cited

U.S. PATENT DOCUMENTS

| | | | |
|---|---|---|---|
| 4,912,602 A * | 3/1990 | Zurek et al. ............... 361/752 |
| 5,535,437 A * | 7/1996 | Karl et al. ................ 455/575.1 |
| 5,691,878 A * | 11/1997 | Ahn et al. .................. 361/674 |
| 6,111,760 A * | 8/2000 | Nixon ......................... 361/814 |
| 6,478,597 B1 | 11/2002 | Roberts et al. |
| 6,757,155 B2 * | 6/2004 | Koike et al. ................ 361/600 |
| 6,894,891 B2 * | 5/2005 | Darr et al. .................. 361/601 |
| 2004/0014340 A1 | 1/2004 | Vargas et al. |

* cited by examiner

*Primary Examiner*—Michael C. Zarroli
(74) *Attorney, Agent, or Firm*—Thomas Rouse; Sandip (Micky) S. Minhas; Abdollah Katbab (57) ABSTRACT

The described embodiments provide mobile electronic devices and associated methods for securely maintaining a connected relationship between device housings. These embodiments include a first housing having at least one first engagement portion and a second housing having at least one second engagement portion, where the second engagement portion is movable between a disconnected state and a connected state relative to the first engagement portion. Further, the second engagement portion is also movable a predetermined engagement distance. Additionally, a limiting structure is positionable adjacent to at least one of the first housing and the second housing such that the limiting structure prevents the second engagement portion from moving the predetermined engagement distance after achieving the connected state.

35 Claims, 4 Drawing Sheets

DEVICES AND METHODS FOR CONNECTING HOUSINGS

STATEMENT REGARDING FEDERALLY SPONSORED RESEARCH OR DEVELOPMENT

The described embodiments were made with government support under United States government contract MDA904-01-G-0620 awarded by the National Security Agency. The government may have certain rights in these described embodiments.

CROSS-REFERENCE TO RELATED APPLICATIONS

This invention is related to applicants' following U.S. Patent Applications, each hereby incorporated by reference: application Ser. No. 10/964,403, entitled "Devices And Methods For Retaining An Antenna," filed concurrently herewith; application Ser. No. 10/963,962, entitled "Devices And Methods For Retaining A Lens In A Mobile Electronic Device," filed concurrently herewith; and application Ser. No. 10/964,105, entitled "Devices And Methods For Creating An Electrical Connection," filed concurrently herewith.

BACKGROUND

The described embodiments relate to devices and methods for connecting housings, and in particular, to devices and methods of securely engaging housings associated with mobile electronic devices.

Mobile electronic devices, such as mobile phones, pagers, personal digital assistants, laptop computers, etc., are becoming increasingly popular for both business and personal use. One reason for this popularity relates to the inherent portability of such devices due to their relatively small size and relatively light weight. A user may have the device with them at all times by simply carrying the device in their pocket, bag or attached to a belt or pocket such as through a clip-on carrier. This portability, however, also requires these devices to be relatively rugged as they are often subjected to rough treatment, including dropping. As such, the components of such devices are typically contained within a casing or housing.

Further, in some applications, these mobile electronic devices are desired to be secure from tampering. For instance, tamper-resistant or tamper-proof or tamper-evident devices are desired: when the device is covered by a warranty; when the device includes confidential components; and when the device is used in an application where confidential use is desired. Typical mechanisms utilized to connect together two housings allow a person to tamper with the device through the interface between the housings without leaving any evidence of the tampering. For example, externally secured mechanical fasteners may be removed and re-installed; or, an adhesive seal may be broken by elevating or lowering the temperature and then re-sealed by bringing the device back to a room temperature; or, detent-type connectors may be disconnected by pushing in on the housing until the detent disengages. As such, typical housings and their associated assembly methods allow a mobile electronic device to be tampered with without providing evidence of the tampering.

Thus, devices and methods for connecting together two housings of a mobile electronic device are desired that securely connect the housings and provide tamper-resistance and/or tamper-evidence.

BRIEF SUMMARY

In accordance with one aspect, the described embodiments provide devices and methods for securely connecting together two housings of a mobile electronic device.

In one embodiment, a mobile electronic device comprises a first housing having at least one first engagement portion and a second housing having at least one second engagement portion. The second engagement portion is movable between a disconnected state and a connected state relative to the first engagement portion. Further, the second engagement portion is movable a predetermined engagement distance. Additionally, the device includes a limiting structure positionable adjacent to at least one of the first housing and the second housing such that the limiting structure prevents the second engagement portion from moving the predetermined engagement distance after achieving the connected state.

In another embodiment, a communications device comprises a first housing having a first inner surface and a first engagement portion connected to the first inner surface. The device also includes a second housing having a second inner surface and a second engagement portion connected to the second inner surface. The second engagement portion is movable in a first direction relative to the first engagement portion between a disconnected state and a connected state. Further, the second engagement portion is elastically deformable in a second direction an amount equal to a predetermined engagement distance at a first location relative to the second housing, wherein the first direction is different from the second direction. Additionally, the device includes a limiting structure connectable between the first inner surface and the second inner surface. The limiting structure is positionable a predetermined limiting distance from at least one of the first housing and the second housing, in a second location relative to the second housing, so as to prevent the second engagement portion from moving the predetermined engagement distance after achieving the connected state. Further, the second location relative to the second housing has a predetermined spacing from the first location.

In yet another embodiment, a communications device comprises a first housing and a second housing movable in a first direction between a disconnected state and a connected state, wherein in the connected state the first housing and the second housing are conjoined. The device includes at least one engagement mechanism associated with the first housing and the second housing. The engagement mechanism has a first engagement portion connectable with a second engagement portion in the connected state. The second engagement portion is movable in the first direction only in the disconnected state, and the second engagement portion is additionally movable a predetermined engagement distance in a second direction different from the first direction to change the first housing and the second housing between the disconnected state and the connected state. The device further includes a limiting structure having a predetermined position relative to at least one of the first housing and the second housing to define an engagement opening sized to receive the second engagement portion and permit movement of the second engagement portion in the first direction and the second direction while in the disconnected state. The engagement opening is sized to restrain movement of the second engagement portion in the second direction to a predetermined limiting distance in the connected state, wherein the predetermined limiting distance is less than the predetermined engagement distance.

In still another embodiment, in a device having two housings connected together, an engagement mechanism comprises a first engagement portion and a second engagement portion movable in a first direction between a disconnected state and a connected state with the first engagement portion. The second engagement portion is movable a predetermined engagement distance in a second direction concurrently with the movement in the first direction, wherein the second direction is different from the first direction. The engagement mechanism including a limiting structure positioned adjacent to at least one of the first housing and the second housing such that the limiting structure prevents the second engagement portion from moving the predetermined engagement distance after achieving the connected state.

In yet another embodiment, a method of preventing disengagement of a first housing and a second housing comprises moving a first engagement portion and a second engagement portion from a disconnected state to a connected state, where one of the first engagement portion and the second engagement portion is movable a predetermined engagement distance. The method further includes preventing relative movement after achieving the connected state between the first engagement portion and the second engagement portion equal to or greater than the predetermined engagement distance.

In a further embodiment, a method of preventing disengagement of a first housing and a second housing comprises conjoining the first housing and the second housing with an elastically deformable locking engagement between corresponding connecting portions. The method includes preventing disengagement of the connecting portions by limiting relative movement of at least one of the connecting portions in a disconnecting direction.

Additional aspects and advantages of the described embodiments are set forth in part in the description which follows, and in part are obvious from the description, or may be learned by practice of the described embodiments. The aspects and advantages of the described embodiments may also be realized and attained by the means of the instrumentalities and combinations particularly pointed out in the appended claims.

BRIEF DESCRIPTION OF THE DRAWINGS

The various described embodiments will hereinafter be described in conjunction with the appended drawings provided to illustrate and not to limit the described embodiments, wherein like designations denote like elements, and in which.

DETAILED DESCRIPTION

The described embodiments provide mobile electronic devices and associated methods where housings are securely and irreversibly connected or conjoined. Coupling together corresponding engaging mechanisms associated with each housing causes the housings to become connected together. A predetermined positioning of a limiting structure relative to the housings allows and maintains the housings in this connected state. The limiting structure permits the connecting engagement of the housings but thereafter stops any relative movement between the housings and/or engagement mechanisms before the engaging mechanisms reach a disconnected state. Thus, the configuration of the engagement mechanisms and the limiting structure fixedly secure together the two housings, providing a tamper-resistant casing for the mobile electronic device.

Before select embodiments are explained in detail, it is to be understood that these described embodiments are not limited in application to the details of the construction and the arrangement of the components set forth in the following description or illustrated in the drawings. The described embodiments are capable of other forms and may be carried out in various ways. Also, it is understood that the phraseology and terminology used herein is for purpose of description and should not be regarded as limiting.

Figure 1:
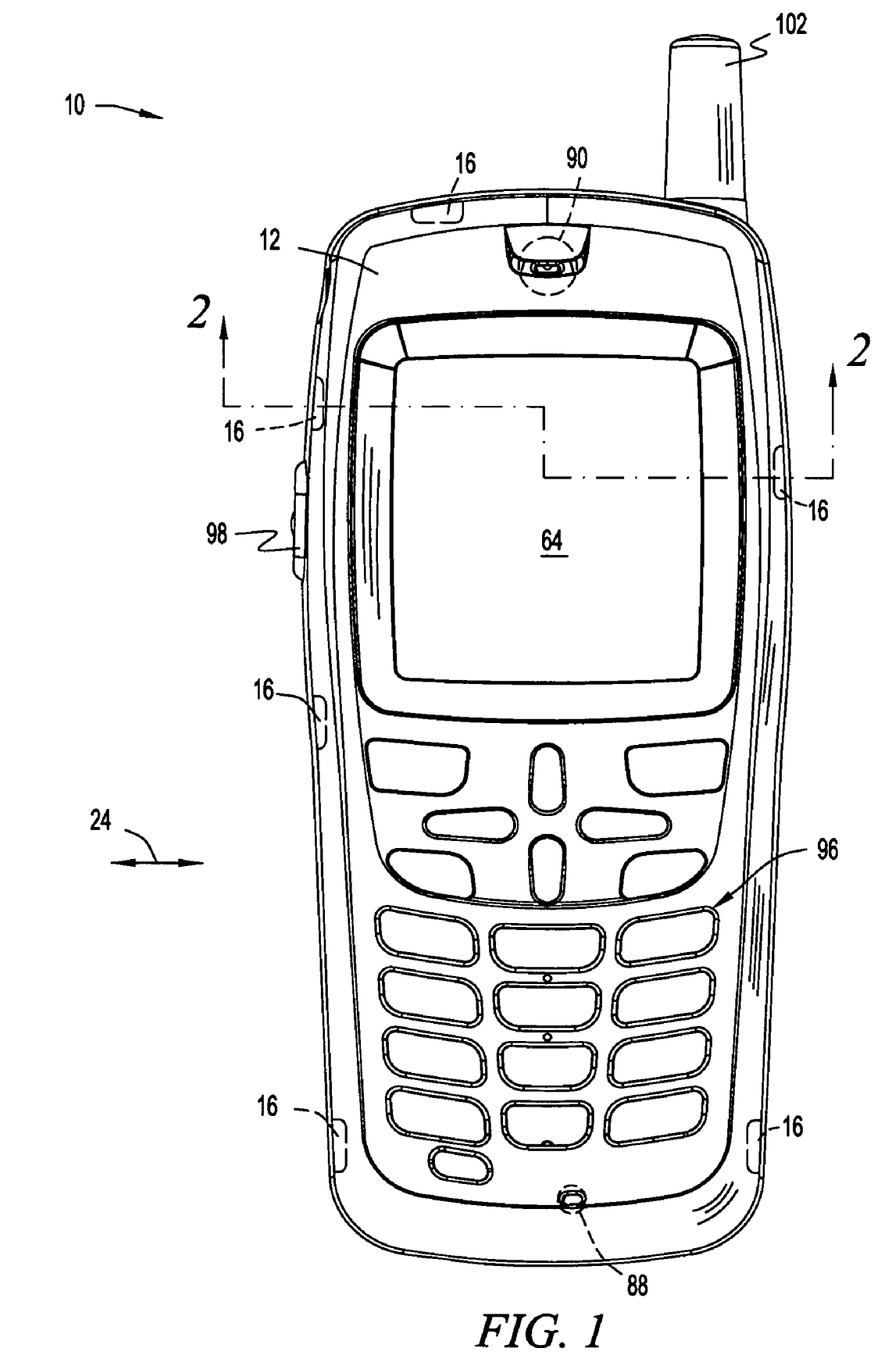
FIG. 1 is a front view of one embodiment of a mobile electronic device.
Figure 2:
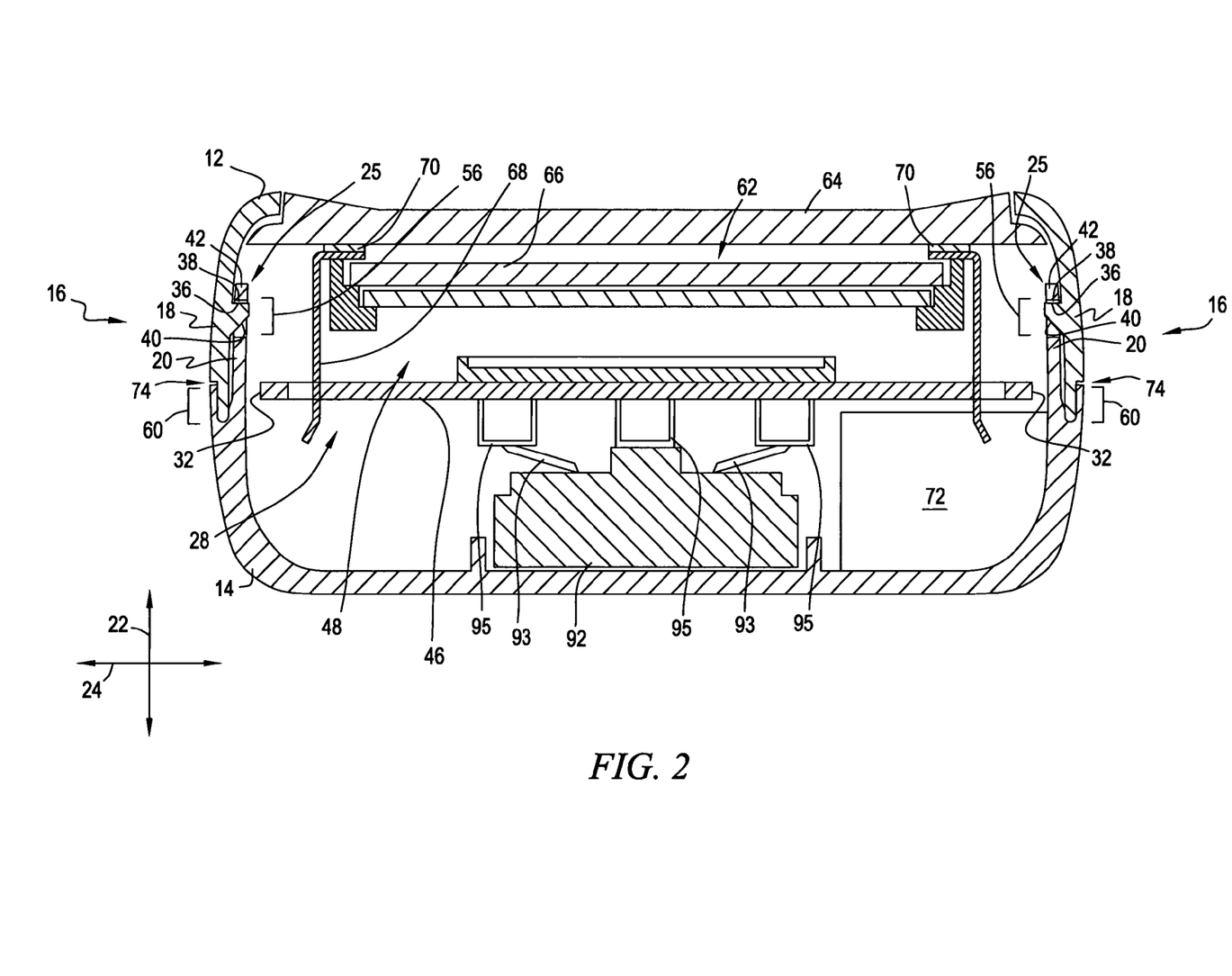
FIG. 2 is a cross-sectional view along line 2—2 of FIG. 1.
Figure 3:
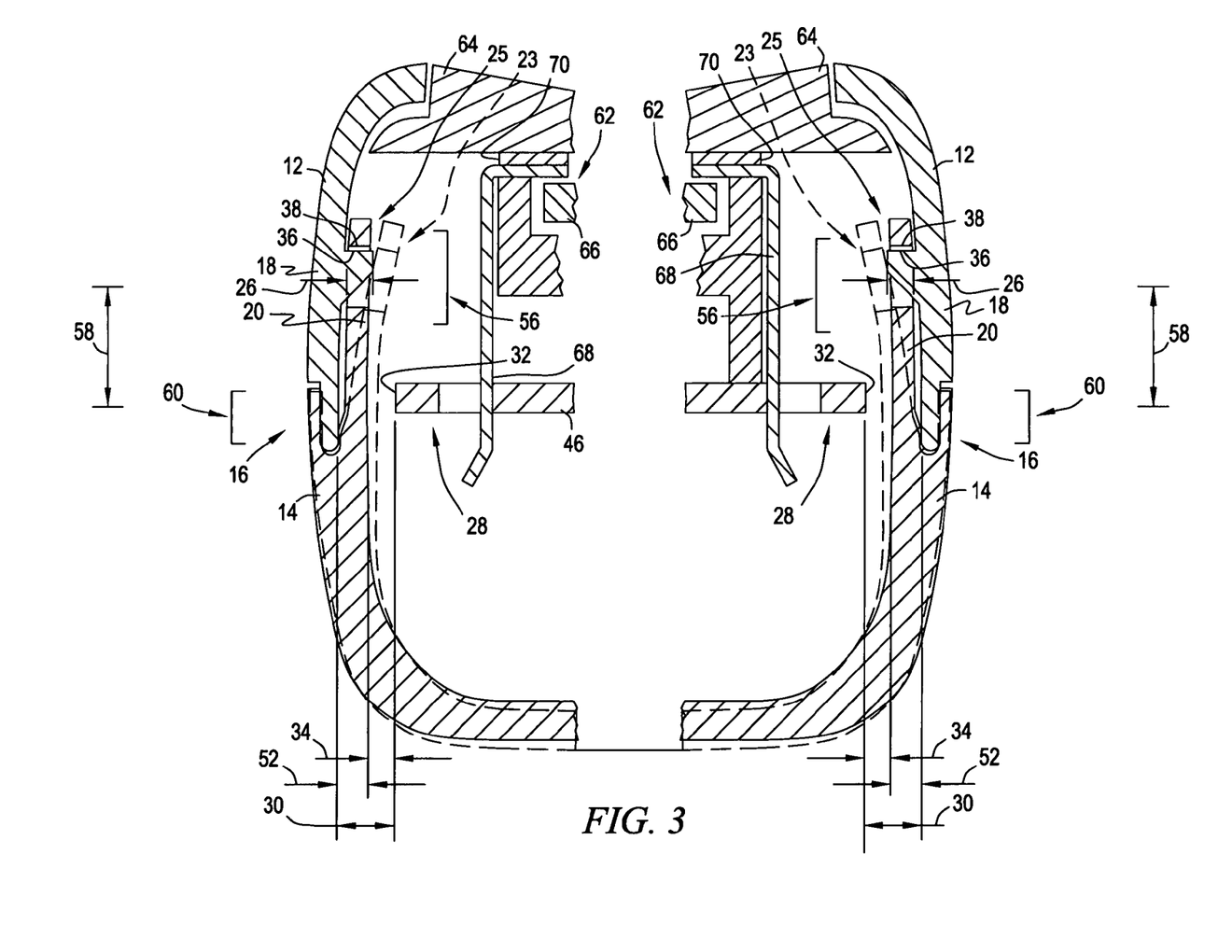
FIG. 3 is a cross-sectional view similar to FIG. 2 but with the middle section removed and the sides enlarged to focus on the engagement mechanism, where the dashed lines represent a partially engaged or disconnected state of the housings.

Referring to FIGS. 1–3, a mobile electronic device 10 includes a first and second housing 12, 14 securely connected together by an engagement mechanism 16. Engagement mechanism 16 includes a first engagement portion 18, such as a projection associated with first housing 12, and a second engagement portion 20, such as a flange associated with second housing 14, that are relatively movable in a first direction 22 between a disconnected state 23 (see FIG. 3) and a connected state 25 (see FIGS. 2 and 3). In the disconnected state 23, first and second housings 12, 14 are not secured together, while in the connected state they are securably fixed together. Also, during movement from the disconnected state to the connected the state, second engagement portion 20 is elastically deformable in a second direction 24 by an amount equal to a predetermined engagement distance 26. Predetermined engagement distance 26 corresponds to an amount of interference or overlap between opposing surfaces of first and second engagement portions 18, 20 that cause first and second housings 12, 14 to be securely connected together. Further, a limiting structure 28 is oriented relative to first housing 12 to define an engagement opening 30 (FIG. 3) sized to receive second engagement portion 20 so that first and second housings 12, 14 may be connected together. However, limiting structure 28 is positioned relative to at least one of first and second housings 12, 14 such that the limiting structure prevents second engagement portion 20 from moving a distance equal to or greater than predetermined engagement distance 26 after engagement mechanism 16 achieves the connected state. In particular, limiting structure 28 includes a limiting surface 32 positioned a predetermined limiting distance 34 (FIG. 3) from second engagement portion 20 when it is in the connected state 25, where predetermined limiting distance 34 is less than predetermined engagement distance 26. Thus, mobile electronic device 10 is secured in the connected state 25 by the arrangement of one or more engagement mechanisms 16 and one or more limiting structures 28, which resist forces that would cause engagement mechanisms 16 to become disconnected, providing a tamper-resistant and a tamper-evident device.

Engagement mechanism 16 includes any structure or arrangement that fixedly or removably connects or couples first and second housings 12, 14. In one embodiment, as discussed above, engagement mechanism 16 includes a snap-type latching mechanism having a first portion 18 in the form of a projection and a second portion 20 in the form of a flange that each include opposing wall surfaces 36, 38 that prevent disengaging movement in first direction 22 once housings 12, 14 are in the connected state 25. In particular, first engagement portion 18 includes a ramp surface 40 that interacts with a distal end 42 of second engagement portion 20, causing the flange to flex or elastically deform and thus move the predetermined engagement distance 26 substantially in second direction 24 when moving from the disconnected state 23 to the connected state 25. In other words, during insertion and while in the disconnected state 23, first engagement portion 18 biases at least a section of second engagement portion 20 into a deformed orientation relative to its natural or relaxed or formed orientation. Predetermined engagement distance 26 corresponds to a distance that second engagement portion 20 travels in second direction 24 to connect with or become disconnected from first engagement portion 18. In one embodiment, for example, predetermined engagement distance 26 corresponds to a height of ramp surface 40 relative to a position of the outer surface of the flange in a relaxed or formed orientation upon initial contact with the projection. Predetermined engagement distance 26 may be an equal distance to connect or disconnect with the first engagement portion 20, or it is possible that the connecting distance could differ from the disconnecting distance, such as if the flange is angled relative to the projection, if the inner surface of the flange is offset from the inner surface of the projection, or if other structures are present that prohibit the flange from entirely returning to its formed orientation.

Once second engagement portion 20 is inserted a desired amount beyond ramp surface 40 in first direction 22, such as where flange wall surface 38 is positioned adjacent to or beyond projection wall surface 36, the flange elastically returns to its formed orientation and flange wall surface 38 moves into an opposing position relative to projection wall surface 36. This opposing orientation of wall surfaces 36, 38 thereby prevents disengagement of housings 12, 14. Wall surfaces 36, 38 may be oriented substantially perpendicular to first direction 22, or at any oblique angle to first direction 22 to create a hook-like engagement between the surfaces which provides an increased resistance to disengagement when compared to perpendicular surfaces. While first engagement portion 18 has been described as a projection and second engagement portion 20 as a flange, it should be understood that these two members may include any corresponding structures that provide opposing wall surfaces 36, 38 that limit a disconnecting movement of second engagement portion 20. In one embodiment, for example, flange wall surface 38 may define an opening through flange that encompasses the body of the projection that defines first engagement portion 18 when in the connected state. In other examples, first engagement portion 18 may include a concave surface within first housing 12, a hook, a latch, or another flange. Similarly, for example, second engagement portion 20 may include a projection, a concave surface, a hook or any other sort of fastener or coupling structure corresponding to first engagement portion 18. Additionally, mobile electronic device 10 may include a plurality of engagement mechanisms 16 dispersed about the perimeter of the opposing housings 12, 14 so that the housings are securely connected together in multiple locations.

Limiting structure 28 includes any structure, arrangement or biasing member positionable adjacent to either first or second housing 12 or 14 to limit movement of second engagement portion 20 in second direction 24 to less than the predetermined engagement distance 26 once engagement mechanism 16 is in the connected state 25. Limiting structure 28 may form a part of or be connected to either first housing 12 or second housing 14. Additionally, limiting structure 28 may be defined by an intermediate functional component, such as an electronics module, a display unit, a keypad, etc., that forms a part of mobile electronic device 10. For example, in one embodiment, limiting structure 28 includes a printed circuit board ("PCB") 46 that includes electronic circuitry and components that form a part of an electronics module 48 to operate mobile electronic device 10. In general, limiting structure 28 includes at least one limiting surface 32, as discussed above, such as a wall or an edge. Limiting surface 32 and first housing 12 define engagement opening 30 that provides clearance for relative movement between first and second engagement portions 18, 20 in first direction 22 so that they may couple together to conjoin housings 12, 14. As such, engagement opening 30 may range from a thickness slightly larger than a thickness 52 of second engagement portion 20 to a thickness slightly less than the sum of second engagement portion thickness 52 and predetermined engagement distance 26. So, when engagement mechanism 16 is in the connected state 25, limiting surface 32 is positioned predetermined limiting distance 34 from second engagement portion 20, where the predetermined limiting distance is less than the predetermined engagement distance 26. As a result, limiting surface 32 may allow some relative translation of opposing wall surfaces 36, 38 but generally does not permit such movement to change engagement mechanism 16 from the connected state 25 to the disconnected state 23, at least not without some component of device 10 thereby breaking and resulting in evidence of such tampering.

Additionally, limiting structure 28 generally defines engagement opening 30 in a first location 56 having a predetermined spacing 58 from a second location 60 associated with all or a portion of the movement of second engagement portion 20 in second direction 24, e.g. the movement corresponding to the predetermined engagement distance 26. First and second locations 56, 60 each may be in a single plane or, more typically, in a range of planes. Further, predetermined spacing 58 may vary depending on the exact configuration and arrangement of engagement mechanism 16, housings 12, 14 and limiting structure 28. For example, in the above-described example where engagement mechanism 16 comprises a projection and a latching flange, predetermined spacing 58 is a distance long enough to provide clearance for the flange to flex during connection of the two housings but short enough such that a later movement of the flange in second direction 24 is stopped by limiting surface 32 before the flange moves the predetermined engagement distance 26 and becomes disconnected with the projection. Additionally, predetermined spacing 58 may include a range of acceptable spacing distances, even for one given configuration of engagement mechanism 16, housings 12, 14 and limiting structure 28.

Therefore, the configuration of engagement mechanism 16 and limiting structure 28 allows at least portions of engagement mechanism 16 to move in both first direction 22 and second direction 24 while housings 12, 14 change from a disconnected state 23 to connected state 25. For example, in one embodiment, first direction 22 may be generally associated with the relative movement that joins together or pulls apart housings 12, 14, which movement may be substantially in a first plane. On the other hand, second direction 24 may be generally associated with a second relative movement related to the interaction between portions 18, 20 of engagement mechanism 16, which movement may be substantially in or parallel to a second plane. Depending on the exact configuration of device 10, these first and second planes, and hence first and second directions 22 and 24 may be substantially perpendicular or oblique to one another. Once housings 12, 14 are in connected state 25, however, the configuration of engagement mechanism 16 and limiting structure 28 substantially prevents movement in first direction 22 and restrains movement in second direction 24 to less than the predetermined engagement distance 26, thereby insuring that the connected state is maintained.

Figure 4:
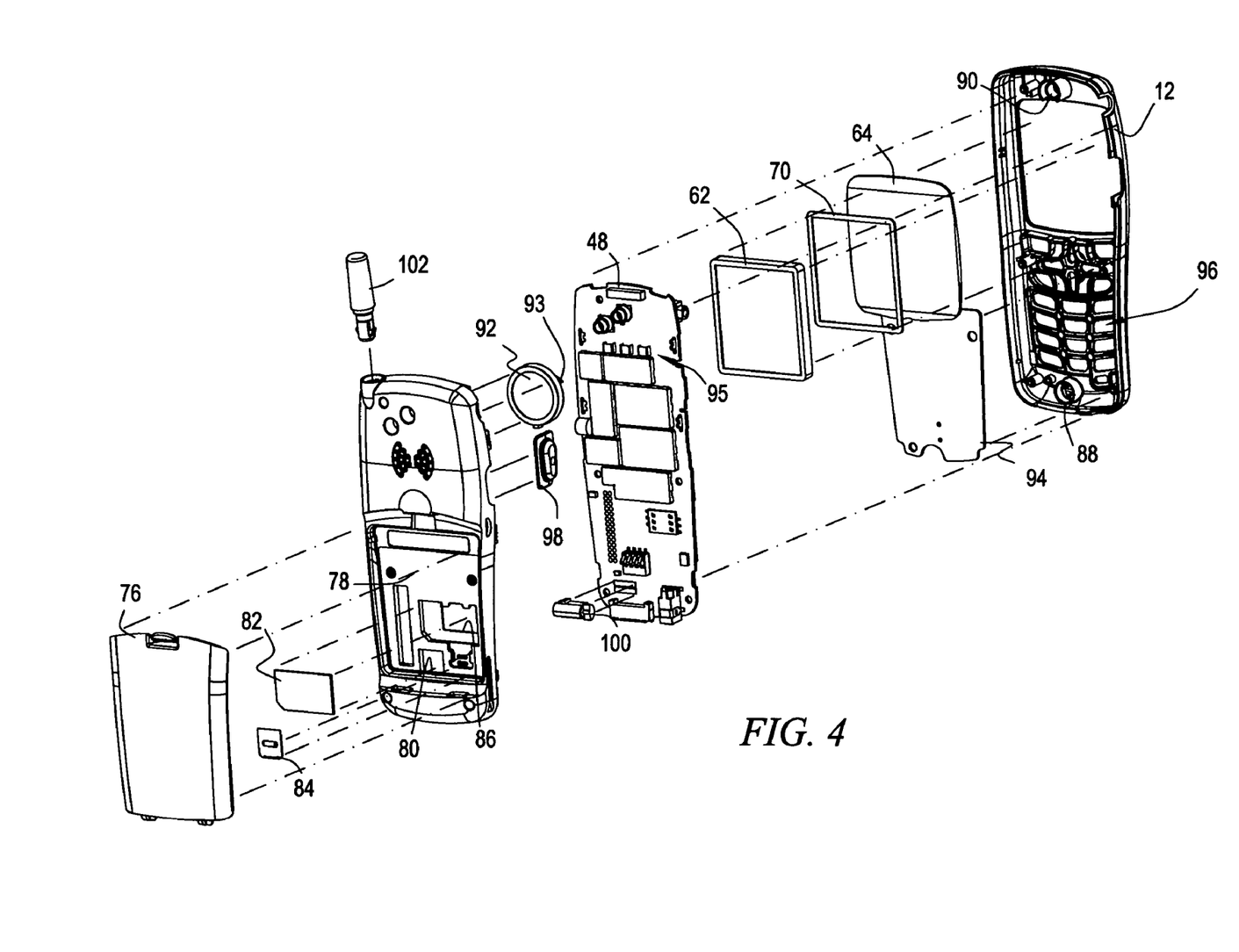
FIG. 4 is an exploded rear perspective view of the components of the device of FIG. 1.

Referring to FIGS. 2–4, mobile electronic device 10 may include any type of portable device having an electronics module 48 for sending output signals to a visual display unit 62 which creates a textual or graphical image viewable by a user. A lens member 64 may be positioned adjacent to display unit 62 to protect the display unit from external damage or tampering. Lens member 64 may include any substantially transparent material capable of providing a protective covering. For instance, lens member 64 may be formed from one or a combination of plastics and glasses. In one embodiment, for example, lens member 64 may be molded from an acrylic such as V825 supplied by Rohm & Haas. Further, lens member 64 may be fixed between housings 12, 14 in a substantially immovable manner so that any attempt to separate the lens from the front housing results in damage to the front housing and/or the lens, and thus provides evidence of tampering. Suitable examples of mobile electronic device 10 include a communications device, a gaming device, a remote control device, a personal computer-type device, a global positioning system ("GPS") receiver or controller, etc. Suitable examples of a communications device for sending and/or receiving communications-related signals include a mobile phone such as a code division multiple access ("CDMA")-, wide-band code division multiple access ("WCDMA")-, global system for mobile communications ("GSM")-, advance mobile phone service ("AMPS")- and time division multiple access ("TDMA")-based system, a satellite phone, a portable phone, a pager, a wireless two way communications device, a personal digital assistant, a personal computer, devices communicating via Bluetooth technology, and other similar types of communications systems involving the receipt and/or transmission of short- or long-range communications signals. For example, one embodiment of mobile electronic device 10 includes the Qualcomm QSec 2700 mobile phone.

Electronics module 48 may further include hardware, software, firmware and combinations thereof that may vary depending on the desired functionality of device 10. For example, electronics module 48 may include one or more circuit boards and associated circuitry and electrical components, such as resistors, capacitors, inductors, connectors, shielding, temporary and permanent memory, logic or applications, processors, etc. In one particular embodiment, for example, electronics module 48 may comprise a communications module associated with a mobile phone that enables device 10 to transmit and receive radio signals.

Visual display unit 62 may include a display mechanism 66 that, in some embodiments may be protected by a casing 68, such as a bezel formed from a rigid material such as a metal or plastic. In one embodiment, display unit 62 is mounted on one side of PCB 46 and is positioned adjacent to first housing 12 and lens member 64 so that it engages the lens member. Suitable examples of display mechanism 66 include a monochrome or color liquid crystal display ("LCD") with passive matrix or active matrix/thin film transistor technology, and light emitting diodes ("LEDs"). Display unit 62 may also include a compressible gasket 70 mounted on casing 68 at one or more portions of the interface with lens member 64. Gasket 70 may be a compressible material, such as rubber, elastomer, foam, felt, etc. Referring particularly to FIG. 2, second housing 14 may include additional support structures, such as wall 72, that either directly engage PCB 46 or directly engage components mounted to the PCB.

Housings 12, 14 provide a protective shell or casing, as well as mounting surfaces, for electronics module 48 and the various other components of device 10. Although represented as front and rear housings that substantially encompass the components of device 10, housings 12, 14 may only partially encompass the device and may be formed from any combination of pieces. Suitable materials for forming housings 12, 14 include plastics, metals, and composites. In one embodiment, referring to FIGS. 2 and 3, first housing 12 of mobile electronic device 10 mates with second housing 14 along a housing interface 74 formed adjacent to the edges of the housings. Housings 12, 14 thereby form an enclosure for electronics module 48 and the other components of device 10. Housing interface 74 may include any type of joint formed by the mating housings 12, 14, such as an abutting joint or an overlapping joint. In one embodiment, for example, housing interface 74 defines a tongue and groove joint that substantially limits movement of all or a portion of first and second housings 12, 14 in a direction normal to the outer surface of the housings at housing interface 74. This tongue and groove joint is an optional feature that provides an additional tamper-resistant capability to device 10.

Mobile electronic device 10 may additionally include various other components depending on the exact function of the device. For example, referring to FIG. 4, for a mobile phone embodiment, device 10 may further include a power module 76 for energizing electronics module 48 and display unit 62. For instance, power module 76, such as a battery pack, may be removably positionable in a recessed portion 78 of second housing 14 such that its electrical connectors mate through an opening 80 with a corresponding electrical connector on electronics module 48. Further, a communications card 82, such as a removable user identity module ("RUIM"), may be removably positionable, such as with a retaining clip 84, within recessed portion 78 such that its electrical connectors mate through an opening 86 with a corresponding electrical connector on electronics module 48. Additionally, the mobile phone embodiment of device 10 may include input and/or output devices 88, 90 and 92, such as a microphone and a near- and far-field audio speaker, respectively, that are additionally secured within housings 12, 14 and connected to electronics module 48. For instance, far-field audio speaker 92 may have leads 93 connected to PCB 46 via electromechanical standoffs 95, which may also support speaker 92 above PCB 46 to create additional space for mounting additional circuit elements. Further, an input mechanism 94, such as an alpha-numeric and functional keypad as well as a navigation mechanism and corresponding keys and circuitry, may be located within housings 12, 14 and extend through predetermined openings 96 in first housing 12 for access by a user. Further, in an embodiment of a phone, a push-to-talk button 98 may extend from housings 12, 14 and connect to corresponding switches on electronics module 48. Similarly, a vibrator motor 100 for silently signaling a user may be positioned within one of housings 12, 14 and connected to electronics module 48. Additionally, an antenna assembly 102 may be secured to either housing 12 or 14 and connected with electronics module 48 to enable transmission and receipt of communications signals.

In operation, one embodiment of a method of preventing disengagement of a first housing and a second housing, and thereby providing a tamper-evident device, includes providing one or more engagement mechanisms on each housing and a limiting structure adjacent to at least one of the housings, such as the inner surface of one or both housings, so that the limiting structure prevents disconnection of the housings once they are engaged. In particular, the first and second housings include one or more corresponding first and second engagement portions that may be coupled together to connect the two housings. And, the limiting structure may be mounted between the housings and at a predetermined position relative to the engagement mechanisms to retain the housings in the connected state. To connect the housings, the housings and corresponding engagement portions are aligned, and the first engagement portion and the second engagement portion are moved toward each other in a first direction, changing from a disconnected state to a connected state. In the process of moving the housings together in the first direction, one of the first engagement portion and the second engagement portion is also movable a predetermined engagement distance in a second direction. In particular, in the case of an engagement mechanism that includes a flange that latches onto a projection or block, the flange may elastically deform in the second direction over the projection as the housings are moved together. After moving in the first direction beyond the projection, the flange returns to its formed position and latches on to the projection to connect the two housings. In order to retain the housings in the connected state, the method further involves preventing relative movement between the first engagement portion and the second engagement portion equal to or greater than the predetermined engagement distance. In particular, the limiting structure is spaced a limiting distance from either the first or second housing to stop any relative movement that would disconnect the engagement mechanism. The limiting distance is less than the predetermined engagement distance, and thus insures that the two housings cannot move into a disconnected state once they have achieved the connected state. As such, the limiting structure provides an engagement opening that allows the first and second engagement portions to move into the connected state, but additionally maintains the connected state by limiting movement of the two portions once they become connected. In other words, the combination of the engagement mechanism allows relative movement of the first and second engagement portions in both the first direction and the second direction during the transition from a disconnected state to a connected state. Once in the connected state, however, the combination of the engagement mechanism and the limiting structure substantially prevents movement in the first direction and limits the movement in the second direction to less than the predetermined engagement distance. Therefore, the configuration of the engagement mechanism and the limiting structure fixedly secure the two housings in the connected state, thereby providing the mobile electronic device with a protective, tamper-resistant casing.

Further details of the structure and assembly of the antenna mechanism may be found in co-pending application Ser. No. 10/964,403, entitled "Devices And Methods For Retaining An Antenna," filed concurrently herewith and incorporated by reference above. Similarly, further details of the structure and assembly of the lens may be found in co-pending application Ser. No. 10/963,962, entitled "Devices And Methods For Retaining A Lens In A Mobile Electronic Device," filed concurrently herewith and incorporated by reference above. Also, further details of the structure and assembly of the standoff mechanism may be found in co-pending application Ser. No. 10/964,105, entitled "Devices And Methods For Creating An Electrical Connection," filed concurrently herewith and incorporated by reference above The previous description of the various embodiments is provided to enable any person skilled in the art to make or use the described embodiments. The various modifications to these embodiments will be readily apparent to those skilled in the art, and the generic principles defined herein may be applied to other embodiments without the use of the inventive faculty. Thus, the scope of this document is not intended to be limited to the embodiments shown herein, but is to be accorded the widest scope consistent with the principles and novel features disclosed herein.

Other features and advantages of the described embodiments are set forth in the following claims.

What is claimed is:

1. A mobile electronic device, comprising:
   a first housing having at least one first engagement portion;
   a second housing having at least one second engagement portion, wherein the second engagement portion is movable a predetermined engagement distance between a disconnected state and a connected state relative to the first engagement portion; and
   a limiting structure positionable a predetermined limiting distance from at least one of the first housing and the second housing such that the limiting structure prevents the second engagement portion from moving the predetermined engagement distance after achieving the connected state, wherein the predetermined limiting distance is less than the predetermined engagement distance;
   wherein the second engagement portion is movable at least part of the predetermined engagement distance in a first plane and wherein the limiting structure is positionable in a second plane spaced apart by the predetermined limiting distance from the first plane.

2. The device of claim 1, wherein the predetermined limiting distance extends parallel to a first axis, and wherein the limiting structure and the first engagement portion are respectively positioned at a first location and a second location spaced apart along a second axis substantially perpendicular to the first axis so as to allow the second engagement portion to move the predetermined engagement distance toward the limiting structure after passing the limiting structure during the movement from the disconnected state to the connected state.

3. The device of claim 1, wherein at least one of the first engagement portion and the second engagement portion comprises a elastically deformable section movable between a first deformed position and a second formed position during movement of the second engagement portion between the disconnected state and the connected state.

4. The device of claim 1, wherein the first engagement portion comprises a first wall having a first limiting surface and the second engagement portion comprises a second wall having a second limiting surface engagable with the first limiting surface in the connected state.

5. The device of claim 1, further comprising an engagement opening defined between the limiting structure and the first housing, the engagement opening having a predetermined size to receive the second engagement portion, wherein the second engagement portion comprises a body having a predetermined thickness, and wherein the predetermined size is greater than the predetermined thickness and less than the sum of the predetermined engagement distance and the predetermined thickness.

6. The device of claim 1, wherein the first housing further comprises a first edge and wherein the second housing further comprises a second edge, wherein at least a portion of the first edge and at least a corresponding portion of the second edge define a mating interface in the connected state, and wherein the mating interface comprises a joint selected from the group consisting of an abutting joint, an overlapped joint and a tongue-and-groove joint.

7. The device of claim 1, wherein the limiting structure comprises an intermediate component mounted between the first housing and the second housing.

8. The device of claim 7, wherein the intermediate component is selected from the group consisting of a wall element, an electronics module, a display unit, and a printed circuit hoard.

9. The device of claim 1, further comprising an electronics module and a display unit, and wherein the device comprises a communications device selected from the group consisting of a code division multiple access ("CDMA")-based mobile phone, a wide-band code division multiple access ("WCDMA")-based mobile phone, a global system for mobile communications ("GSM")-based mobile phone, an advance mobile phone service ("AMPS")-based mobile phone, a time division multiple access ("TDMA")-based mobile phone, a satellite phone, a portable phone, a pager, a wireless two way communications device, a personal digital assistant, a personal computer, a shod-range communications device, and a long-range communications device.

10. The device of claim 1, wherein the first housing further comprises a first edge at least adjacent to each first engagement portion and wherein the second housing further comprises a second edge at least adjacent to each second engagement portion, wherein at least a portion of each first edge and at least a corresponding portion of each second edge define a mating interface in the connected state, and wherein the mating interface comprises a tongue-and-groove joint.

11. The device of claim 1, wherein the second engagement portion comprises opposing sides defining a substantially constant predetermined thickness in the first plane and further comprises an internal wall defining an opening operable in the connected state to receive the first engagement portion.

12. A mobile electronic device, comprising:
a first housing having at least one first engagement portion;
a second housing having at least one second engagement portion, wherein the second engagement portion is movable between a disconnected state and a connected state relative to the first engagement portion, and wherein the second engagement portion is movable a predetermined engagement distance;
a limiting structure positionable adjacent to at least one of the first housing and the second housing such that the limiting structure prevents the second engagement portion from moving the predetermined engagement distance after achieving the connected state; and
wherein the first engagement portion, arid the second engagement portion are relatively movable in a first direction substantially parallel to a first plane, and wherein the second engagement portion is movable for the predetermined engagement distance in a second direction substantially parallel to a second plane, and wherein a relative orientation of the first plane and the second plane is defined by an angle selected from the group consisting of an oblique angle and a substantially perpendicular angle.

13. A communications device, comprising;
a first housing having a first inner surface and a first engagement portion connected to the first inner surface;
a second housing having a second inner surface and a second engagement portion connected to the second inner surface, wherein the second engagement portion is movable in a first direction relative to the first engagement portion between a disconnected state and a connected state, wherein the second engagement portion is elastically deformable in a second direction an amount equal to a predetermined engagement distance at a first location relative to the second housing, wherein the first direction is different from the second direction, wherein the second engagement portion comprises a section extending adjacent to the first engagement portion in the connected state, the section having opposing sides defining a substantially constant predetermined thickness in the second direction and comprising an internal wall defining an opening operable in the connected state to receive the first engagement portion; and
a limiting structure connectable between the first inner surface and the second inner surface and positionable a predetermined limiting distance from at least one of the first housing and the second housing, in a second location relative to the second housing, wherein the predetermined limiting distance is less than the predetermined engagement distance so as to prevent the second engagement portion from moving the predetermined engagement distance after achieving the connected state, and wherein the second location relative to the second housing has a predetermined spacing from the first location.

14. The device of claim 13, wherein the first direction is substantially parallel to a first plane, and wherein the second direction substantially parallel to a second plane, and wherein a relative orientation of the first plane and the second plane is defined by an angle selected from the group consisting of an oblique angle and a substantially perpendicular angle.

15. The device of claim 14, further comprising an electronics module and a display unit, and wherein the device comprises a communications device selected from the group consisting of a code division multiple access ("CDMA")-based mobile phone, a wide-band code division multiple access ("WCDMA")-based mobile phone, a global system for mobile communications ("GSM")-based mobile phone, an advance mobile phone service ("AMPS")-based mobile phone, a time division multiple access ("TDMA")-based mobile phone, a satellite phone, a portable phone, a pager, a wireless two way communications device, a personal digital assistant, a personal computer, a short-range communications device, and a long-range communications device.

16. A communications device, comprising:
a first housing and a second housing movable in a first direction between a disconnected state and a connected state, wherein in the connected state the first housing and the second housing are conjoined;
at least one engagement mechanism associated with the first housing and the second housing, the engagement mechanism having a first engagement portion connectable with a second engagement portion in the connected state, wherein the second engagement portion is movable in the first direction only in the disconnected state, wherein the second engagement portion is additionally movable a predetermined engagement distance in a second direction different from the first direction to change the first housing and the second housing between the disconnected state and the connected state, wherein the second engagement portion comprises a section extending adjacent to the first engagement portion in the connected state, the section having a substantially constant predetermined thickness in the second direction and further comprises an internal wall defining a through-hole operable in the connected state to receive the first engagement portion; and a limiting structure having a predetermined position relative to at least one of the first housing and the second housing to define an engagement opening sized to receive the second engagement portion and permit movement of the second engagement portion in the first direction and the second direction while in the disconnected state, and wherein tie engagement opening is sized to restrain movement of the second engagement portion in the second direction to a predetermined limiting distance in the connected state, wherein the predetermined limiting distance is less than the predetermined engagement distance.

17. The device of claim 16, wherein the second engagement portion is movable at least part of the predetermined engagement distance in a first location and wherein the limiting structure is positionable in a second location spaced apart a predetermined distance from the first location.

18. In a device having two housings connected together, an engagement mechanism comprising:
a first engagement portion;
a second engagement portion movable in a first direction between a disconnected state and a connected state with the first engagement portion, and wherein the second engagement portion is movable a predetermined engagement distance in a second direction concurrently with the movement in the first direction, wherein the second direction is different from the first direction; and
a limiting structure positioned a predetermined limiting distance front at least one of the first housing and the second housing such that the limiting structure prevents the second engagement portion from moving fire predetermined engagement distance after achieving the connected state, wherein the predetermined limiting distance is less than the predetermined engagement distance.

19. The device of claim 18, further comprising an electronics module and a display unit, and wherein the device comprises a communications device selected from the group consisting of a code division multiple access ("CDMA")-based mobile phone, a wide-band code division multiple access ("WCDMA")-based mobile phone, a global system for mobile communications ("GSM")-based mobile phone, an advance mobile phone service ("AMPS")-based mobile phone, a time division multiple access ("TDMA")-based mobile phone, a satellite phone, a portable phone, a pager, a wireless two way communications device, a personal digital assistant, a personal computer, a short-range communications device, and a long-range communications device.

20. The device of claim 18, wherein the first engagement portion further comprises a first edge and wherein the second engagement portion further comprises a second edge, wherein at least a portion of the first edge and at least a corresponding portion of the second edge define a mating interface in the connected state, wherein the mating interface comprises a tongue-and-groove joint, and wherein the second engagement portion comprises a substantially constant predetermined thickness in the second direction and further comprises an internal wall defining an opening operable in the connected state to receive the first engagement portion.

21. A method of preventing disengagement of a first housing and a second housing, comprising:
moving a first engagement portion and a second engagement portion from a disconnected state to a connected state, where one of the first engagement portion and the second engagement portion comprises a section adjacent to the other portion in the connected state, the section having a substantially constant thickness and defining an opening therein for receiving in the connected state the other portion, where the one portion is movable a predetermined engagement distance during the movement between the disconnected state and the connected state, where the one portion is movable in the disconnected state past a limiting structure positioned a predetermined limiting distance from at least one of the first housing and the second housing, where the predetermined limiting distance is less than the predetermined engagement distance; and
preventing relative movement, after achieving the connected state, between the first engagement portion and the second engagement portion equal to or greater than the predetermined engagement distance.

22. The method of claim 21, where the moving of the first engagement portion and the second engagement portion front the disconnected state to the connected state further comprises moving the predetermined engagement distance after passing the limiting structure.

23. The method of claim 22, where the moving of the first engagement portion and the second engagement portion from the disconnected state to the connected state further comprises creating a elastically deformable locking engagement between the first engagement portion and the second engagement portion.

24. The method of claim 23, where the locking engagement occurs substantially in a first plane and where the preventing relative movement occurs substantially in a second plane, where the first plane and the second plane are spaced apart a predetermined distance.

25. A method of preventing disengagement of a first housing and a second housing, comprising:
conjoining the first housing and the second housing with an elastically deformable locking engagement between corresponding connecting portions;
preventing disengagement of the connecting portions by limiting relative movement of at least one of the connecting portions in a disconnecting direction;
where the preventing of disengagement further comprises positioning a limiting structure a predetermined limiting distance adjacent to the corresponding connecting portions, where the predetermined limiting distance is less than a predetermined engagement distance moved by at least one of the corresponding connecting portions in achieving the elastically deformable locking engagement; and
where conjoining further comprises inserting a section of one of the corresponding connecting portions in between the limiting structure and the other one of the corresponding connecting portions, where the section comprises a substantially constant thickness adjacent to the other one of the corresponding portions and further comprises an opening therein for receiving during locking engagement the other one of the connecting portions.

26. The method of claim 25, where conjoining the first housing and the second housing further comprises moving the one of the corresponding connecting portions past the limiting structure in a first direction parallel to the limiting structure and thereafter moving the predetermined engagement distance in a second direction toward the limiting structure during movement in the first direction to achieve the locking engagement with the other one of the corresponding connecting portions.

27. A mobile electronic device, comprising:
a first housing having at least one first engagement portion;
a second housing having at least one second engagement portion, wherein the second engagement portion is movable a predetermined engagement distance between a disconnected state and a connected state relative to the first engagement portion;
a limiting structure positionable a predetermined limiting distance from at least one of the first housing and the second housing such that the limiting structure prevents the second engagement portion from moving the predetermined engagement distance after achieving the connected state, wherein the predetermined limiting distance is less than the predetermined engagement distance; and
wherein the predetermined limiting distance extends parallel to a first axis, and wherein the limiting structure and the first engagement portion are respectively positioned at a first location and a second location spaced apart along a second axis substantially perpendicular to the first axis so as to allow the second engagement portion to move the predetermined engagement distance toward the limiting structure after passing the limiting structure daring the movement from the disconnected state to the connected state.

28. The device of claim 27, wherein the first housing further comprises a first edge at least adjacent to each first engagement portion and wherein the second housing further comprises a second edge at least adjacent to each second engagement portion, wherein at least a portion of each first edge and at least a corresponding portion of each second edge define a mating interface in the connected state, and wherein the mating interface comprises a tongue and-groove joint.

29. The device of claim 27, wherein the second engagement portion comprises opposing sides defining a substantially constant predetermined thickness in the first plane and further comprises an internal wall defining an opening operable in the connected state to receive the first engagement portion.

30. The device of claim 27, wherein the first housing further comprises a first edge at least adjacent to each first engagement portion and wherein the second housing further comprises a second edge at least adjacent to each second engagement portion, wherein at least a portion of each first edge and at least a corresponding portion of each second edge define a mating interface in the connected state, and wherein the mating, interface comprises a tongue-and-groove joint, wherein the second engagement portion comprises a substantially constant predetermined thickness in the first plane and further comprises an internal wall defining an opening operable in the connected state to receive the first engagement portion.

31. A method of preventing disengagement of a first housing and a second housing, comprising:

conjoining the first housing and the second housing with an elastically deformable locking engagement between corresponding connecting portions;
preventing disengagement of the connecting portions by limiting relative movement of at least one of the connecting portions in a disconnecting direction; and
where the preventing of disengagement further comprises positioning a limiting structure a predetermined limiting distance adjacent to the corresponding connecting portions, where the predetermined limiting distance is less than a predetermined engagement distance moved by at least one of the corresponding connecting portions in achieving the elastically deformable locking engagement;
where conjoining the first housing and the second housing further comprises moving the one of the corresponding connecting portions past the limiting structure in a first direction parallel to the limiting structure and thereafter moving the predetermined engagement distance in a second direction toward the limiting structure during movement in the first direction to achieve the locking engagement with the other one of the corresponding connecting portions.

32. A communications device, comprising:
means for conjoining the first housing and the second housing with an elastically deformable locking engagement between corresponding connecting portions;
means for preventing disengagement of the connecting portions by limiting relative movement of at least one of the connecting portions in a disconnecting direction; and
wherein the means for preventing of disengagement farther comprises means for positioning a limiting structure a predetermined limiting distance adjacent to the corresponding connecting portions, wherein the predetermined limiting distance is less than a predetermined engagement distance moved by at Least one of the corresponding connecting portions in achieving the elastically deformable locking engagement;
wherein the means for conjoining the first housing and the second housing further comprises means allowing for moving the one of the corresponding connecting portions past the limiting structure in a first direction parallel to the limiting structure and thereafter moving the predetermined engagement distance in a second direction toward the limiting structure during movement in the first direction to achieve the locking engagement with the other one of the corresponding connecting portions.

33. A communications device, comprising:
means allowing for movement of a first engagement portion and a second engagement portion front a disconnected state to a connected state, wherein one of the first engagement portion and the second engagement portion comprises a section adjacent to the other portion in the connected state, the section having a substantially constant thickness and defining an opening therein for receiving in the connected state the other portion, wherein the one portion is movable a predetermined engagement distance during the movement between the disconnected state and the connected state, wherein the one portion is movable in the disconnected state past a limiting structure positioned a predetermined limiting distance from at least one of the first housing and the second housing, wherein the predetermined limiting distance is less than the predetermined engagement distance; and means for preventing relative movement, after achieving the connected state, between the first engagement portion and the second engagement portion equal to or greater than the predetermined engagement distance.

34. The device of claim 33, wherein the means allowing for moving of the first engagement portion and the second engagement portion from the disconnected state to the connected state further comprises means allowing for moving the predetermined engagement distance after passing the limiting structure.

35. A communications device, comprising:
means for conjoining the first housing and the second housing with an elastically deformable locking engagement between corresponding connecting portions;
means for preventing disengagement of the connecting portions by limiting relative movement of at least one of the connecting portions in a disconnecting direction;
wherein the means for preventing of disengagement farther comprises means for positioning a limiting structure a predetermined limiting distance adjacent to the corresponding connecting portions, wherein the predetermined limiting distance is less than a predetermined engagement distance moved by at least one of the corresponding connecting portions in achieving the elastically deformable locking engagement; and
wherein the means for conjoining further comprises means allowing for inserting a section of one of the corresponding connecting portions in between the limiting structure and the other one of the corresponding connecting portions, where the section comprises a substantially constant thickness adjacent to the other one of the corresponding portions and further comprises an opening therein for receiving during locking engagement the other one of the connecting portions.

* * * * *